United States Patent
Tsukamoto et al.

(10) Patent No.: US 7,650,973 B2
(45) Date of Patent: Jan. 26, 2010

(54) HYDRAULIC POWER TRANSMISSION DEVICE

(75) Inventors: Kazumasa Tsukamoto, Toyota (JP); Kazuhisa Ozaki, Anjo (JP); Takeshi Inuzuka, Anjo (JP); Mitsugu Yamashita, Anjo (JP); Atsuhiro Mase, Handa (JP)

(73) Assignee: Aisin AW Co., Ltd., Anjo (JP)

( * ) Notice: Subject to any disclaimer, the term of this patent is extended or adjusted under 35 U.S.C. 154(b) by 259 days.

(21) Appl. No.: 11/473,057

(22) Filed: Jun. 23, 2006

(65) Prior Publication Data

US 2007/0007095 A1   Jan. 11, 2007

(30) Foreign Application Priority Data

Jul. 6, 2005   (JP) .............. 2005-197126

(51) Int. Cl.
  *F16H 45/02* (2006.01)
  *F16D 39/00* (2006.01)
(52) U.S. Cl. .............. 192/3.3; 192/55.61; 192/57; 192/213.2
(58) Field of Classification Search ........... 192/3.29, 192/3.3, 57, 55.61, 207–214.1
See application file for complete search history.

(56) References Cited

U.S. PATENT DOCUMENTS

| | | | |
|---|---|---|---|
| 3,730,315 A * | 5/1973 | Annis et al. ........... 192/3.3 |
| 4,274,520 A | 6/1981 | Van der Hardt Aberson |
| 4,637,500 A * | 1/1987 | Gobel et al. ........... 192/3.28 |
| 4,733,761 A * | 3/1988 | Sakakibara ........... 192/3.25 |
| 5,334,112 A * | 8/1994 | Nogle et al. ........... 475/59 |
| 5,377,796 A * | 1/1995 | Friedmann et al. ........ 192/3.29 |
| 5,685,404 A | 11/1997 | Fukushima |
| 6,016,894 A * | 1/2000 | Kundermann ........... 192/3.3 |
| 6,439,361 B2 * | 8/2002 | Maienschein et al. ....... 192/3.3 |
| 6,695,110 B2 * | 2/2004 | Maienschein et al. ....... 192/3.3 |
| 2005/0155831 A1 * | 7/2005 | Masuya ............ 192/3.3 |

FOREIGN PATENT DOCUMENTS

| | | | | |
|---|---|---|---|---|
| DE | 44 44 242 A1 | 6/1995 | | |
| JP | A-55-60755 | 5/1980 | | |
| JP | 03066967 | * 3/1991 | ............... 192/3.29 |
| JP | A-8-93878 | 4/1996 | | |
| JP | A 2001-514366 | 9/2001 | | |
| WO | WO 99/10664 | 3/1999 | | |

* cited by examiner

*Primary Examiner*—Rodney H Bonck
(74) *Attorney, Agent, or Firm*—Oliff & Berridge, PLC

(57) ABSTRACT

A hydraulic power transmission device includes a toroid portion, a turbine hub, and a lock-up device. The toroid portion includes a pump impeller and a turbine runner. The turbine hub is engaged with an input shaft of a transmission and holds the turbine runner. The lock-up device is installed so that it engages and disengages freely and it mechanically transmits to the turbine hub rotation that is transmitted from a drive power source. The toroid portion and the lock-up device overlap in the axial direction. Because the toroid portion and the lock-up device overlap in the axial direction, the size of the hydraulic power transmission device in the axial direction can be reduced, and the hydraulic power transmission device can be made more compact.

14 Claims, 2 Drawing Sheets

HYDRAULIC POWER TRANSMISSION DEVICE

INCORPORATION BY REFERENCE

The disclosure of Japanese Patent Application No. 2005-197126 filed on Jul. 6, 2005, from which priority is claimed, including the specification, drawings and abstract is incorporated herein by reference in its entirety.

BACKGROUND

The invention relates to a hydraulic power transmission device.

In a conventional automatic transmission, torque generated by an engine is transmitted to the transmission via a torque converter as a hydraulic power transmission device. Gear shifting is performed in the transmission, and the torque is transmitted to a drive shaft. The torque converter has a case, which consists of a front cover, rear cover, etc., plus a pump impeller, a turbine runner, a stator, a one-way clutch, a lock-up device, a damper device, etc. The torque converter transmits torque via oil circulating in its interior and acts as a torque conversion device or a fluid coupling.

More specifically, rotation that is transmitted from the engine via the crankshaft is transmitted to the pump impeller via the front cover and the rear cover. When the pump impeller rotates, the oil inside the torque converter circulates by centrifugal force among the pump impeller, the turbine runner, and the stator, causing the turbine runner to rotate. The turbine runner is coupled to the transmission input shaft such that the output from the torque converter is transmitted to the transmission. The stator is positioned between the pump impeller and the turbine runner, and when there is a large difference in the rotation speeds of the pump impeller and the turbine runner, the stator converts the oil flow to a direction that assists the rotation of the pump impeller, thereby increasing the torque.

In the torque converter, the lock-up device is provided to prevent energy loss due to oil slippage. When the vehicle speed reaches a prescribed value, the lock-up device mechanically couples the front cover and the turbine runner. The rotation that is transmitted from the engine is therefore transmitted to the input shaft via the front cover and the lock-up device, preventing energy loss due to oil slippage. (See, for example, the published Japanese translation of PCT international application No. 2001-514366.)

However, in a conventional torque converter, the positioning of the lock-up device adjacent to the turbine runner increases the length of the torque converter in the axial direction, making the torque converter larger.

SUMMARY

The invention thus provides, among other things, a hydraulic power transmission device that solves the aforementioned problem of the conventional torque converter and that can be made more compact.

The hydraulic power transmission device in according to the invention includes a toroid portion, a turbine hub, and a lock-up device. The toroid portion includes a pump impeller and a turbine runner. The turbine hub is engaged with an input shaft of a transmission and holds the turbine runner. The lock-up device is installed so that it engages and disengages freely and it mechanically transmits to the turbine hub rotation that is transmitted from a drive power source.

The toroid portion and the lock-up device overlap in the axial direction.

Because the toroid portion and the lock-up device overlap in the axial direction, the size of the hydraulic power transmission device in the axial direction can be reduced, and the hydraulic power transmission device can be made more compact.

BRIEF DESCRIPTION OF THE DRAWINGS

Embodiments of the invention will be explained below with reference to the drawings in which.

DETAILED DESCRIPTION OF EMBODIMENTS

Note that in a first embodiment, a torque converter is explained as a hydraulic power transmission device, and in a second embodiment, a fluid coupling is explained as a hydraulic power transmission device.

Figure 1:
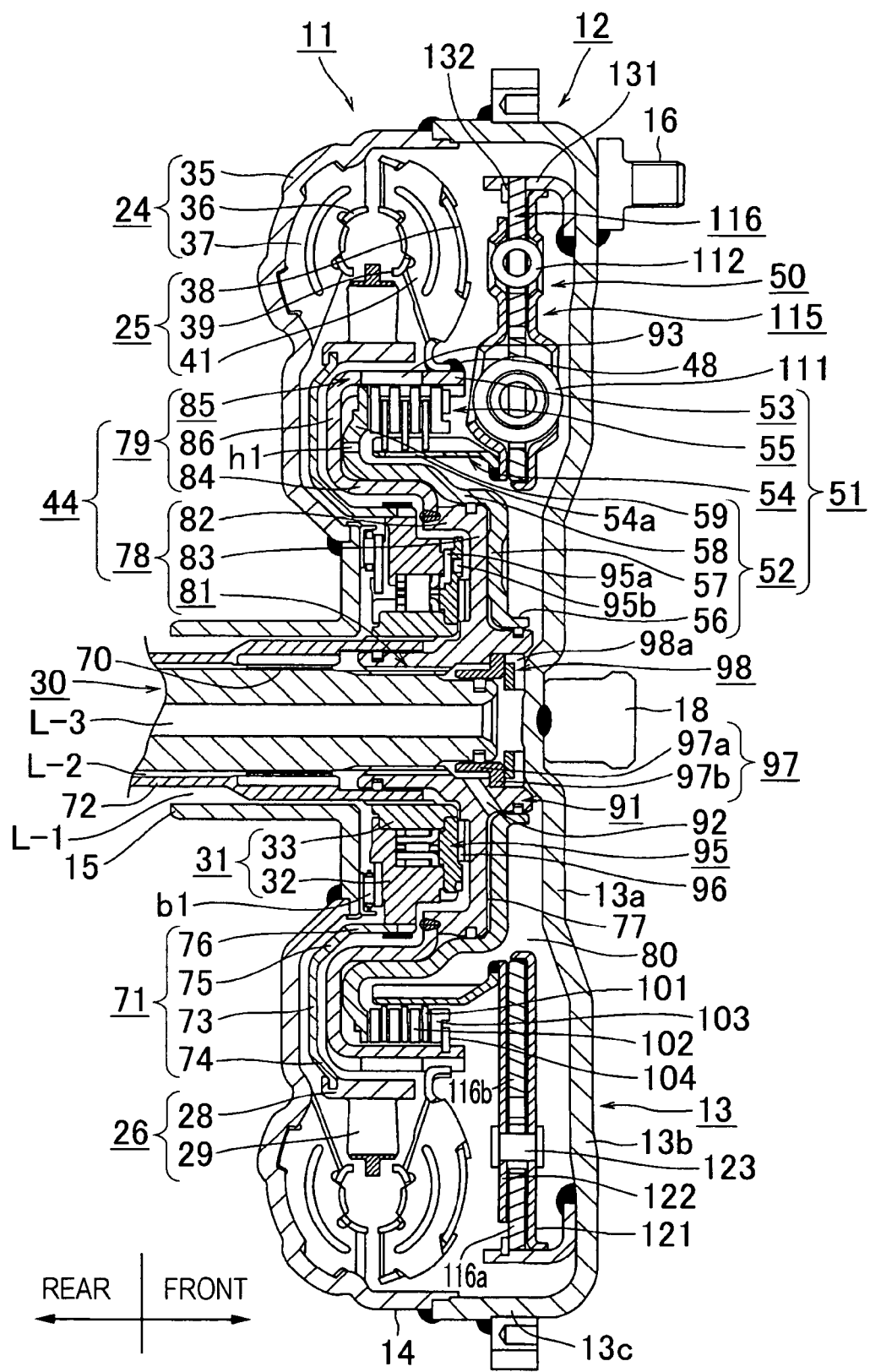
FIG. 1 is a sectional view of a torque converter in accordance with a first embodiment of the invention.

FIG. 1 is a sectional view of a torque converter in accordance with a first embodiment of the invention.

In FIG. 1, reference numeral 11 denotes the torque converter, and reference numeral 12 denotes a case. The case 12 is provided with a front cover 13, a rear cover 14 that is welded to the front cover 13, a pump hub 15 that is welded to the rear cover 14, and the like. The front cover 13 is coupled via a drive plate (not shown) and a coupling member 16 to an engine crankshaft (not shown), which serves as a drive power source. The front cover 13 is rotated in conjunction with the input of rotation from the engine.

The front cover 13 includes a flat portion 13a, a bulging portion 13b, and a cylindrical portion 13c. The flat portion 13a is formed just to the outside of the center of the cover. The bulging portion 13b is formed approximately two-thirds of the way to the outer edge of the cover and bulges forward (to the right in FIG. 1). The cylindrical portion 13c is formed around the outer edge of the bulging portion 13b and is oriented in the axial direction. A center piece 18 is affixed by welding in the center of the front cover 13. The torque converter 11 is centered by inserting the center piece 18 into a shaft hole in the crankshaft. Note that the front cover 13 and the center piece 18 form an input portion rotating body. Also, a motor, etc., can be used instead of an engine as the drive power source.

The pump hub 15 is supported, in a manner that allows it to rotate freely, by a partition (not shown) that separates the engine from the transmission. The rear edge of the pump hub 15 (to the left in FIG. 1) is connected to an oil pump that is installed inside the partition.

The torque converter 11 includes a pump impeller 24, a turbine runner 25, a turbine hub 44, a stator 26, a lock-up device 51, a damper device 50, and the like. The pump impeller 24 is connected to the case 12 and the front cover 13 and is installed in such a manner that it rotates freely. When rotation is imparted or transmitted to the pump impeller 24 by the front cover 13, the pump impeller 24 causes oil, as a working fluid, to flow by centrifugal force from the inner perimeter to the outer perimeter. The turbine runner 25 faces the pump impeller 24 and is installed in such a manner that it rotates freely. When the flow of oil to the outer perimeter that accompanies the rotation of the pump impeller 24 reaches the turbine runner 25, the return flow of the oil toward the inner perimeter causes the turbine runner 25 to rotate. The turbine hub 44 supports the turbine runner 25 and is installed in such a manner that it rotates freely. The stator 26 changes the direction of the oil flow at the inner perimeter of the pump impeller 24 and the turbine runner 25, increasing the torque that is transmitted from the pump impeller 24 to the turbine runner 25. The lock-up device 51 is installed in such a manner that it engages and disengages freely. The lock-up device 51 takes or receives the rotation that is transmitted from the engine and transmits it mechanically, not via the oil, to the turbine hub 44. The damper device 50 is attached to the front cover 13 and absorbs the torque fluctuation that is generated by the engagement and disengagement of the lock-up device 51. Note that the pump impeller 24, the turbine runner 25, and the stator 26 form a toroid portion.

The stator 26 includes a ring-shaped stator hub 28, which acts as a support, and blades 29, which are affixed in a radial pattern to the outer perimeter of the stator hub 28 at a prescribed pitch. To the inside of the stator 26 in the radial direction, a stator flange 71 serves as a ring-shaped connecting member that connects the stator 26 to a one-way clutch 31 that allows the stator 26 to rotate in only one direction. The one-way clutch 31 includes an outer race 32 and an inner race 33. The outer race 32 is fastened to the stator flange 71, and the inner race 33 is attached by means of a spline fitting to the outer perimeter of a fixed sleeve 72 that is connected to the oil pump. Note that a first oil passage L-1 is formed between the pump hub 15 and the fixed sleeve 72.

The stator flange 71 includes a flat portion 73, a slanting portion 74, a slanting portion 75, and a cylindrical portion 76. The flat portion 73 extends in a direction orthogonal to the axial direction. The slanting portion 74 extends obliquely outward from the flat portion 73 in the radial direction and its forward edge attaches to the stator hub 28. The slanting portion 75 extends obliquely inward from the flat portion 73 in the radial direction. The cylindrical portion 76 extends forward in the axial direction from the forward edge of the slanting portion 75 and its forward edge attaches to the outer race 32.

The pump impeller 24 includes an outer shell 35, an inner core 36, and a plurality of blades 37. The outer shell 35 is formed by a part of the rear cover 14. The inner core 36 is installed at a prescribed interval from the outer shell 35. The plurality of blades 37 are installed between the outer shell 35 and the inner core 36. The turbine runner 25 includes an outer shell 38, an inner core 39, and a plurality of blades 41. The inner core 39 is installed at a prescribed interval from the outer shell 38. The plurality of blades 41 are installed between the outer shell 38 and the inner core 39.

The inner perimeter edge of the turbine hub 44 is fastened to a transmission input shaft 30 by means of a spline fitting. The outer perimeter edge of the turbine hub 44 is fastened to the turbine runner 25. The rotation of the turbine runner 25 is transmitted to the input shaft 30. Note that the input shaft 30 is supported by the fixed sleeve 72 via bush 70, which is a roller bearing, in such a way that the input shaft 30 rotates freely, thereby functioning as an output shaft of the torque converter 11. A second oil passage L-2 is formed between the fixed sleeve 72 and the input shaft 30. A third oil passage L-3 is formed inside the input shaft 30.

The turbine hub 44 is a ring-shaped body with an S-shaped cross section and includes an inner portion 78 as a first portion that functions as an oil servo and an outer portion 79 as a second portion that functions as a clutch drum. The inner portion 78 is positioned mainly in front of the one-way clutch 31 and is enveloped by the one-way clutch 31. The outer portion 79 is positioned mainly to the rear of the lock-up device 51 (on the left in FIG. 1), in a space enclosed by the stator 26, the stator flange 71, and the one-way clutch 31, and is enveloped by the lock-up device 51. The inner portion 78 and the outer portion 79 are joined by a weld.

The inner portion 78 includes a first cylindrical portion 81, positioned to the inside in the radial direction, a second cylindrical portion 82, positioned to the outside in the radial direction, and a base portion 83, positioned between the first and second cylindrical portions 81, 82 and orthogonal to the axial direction. The inner portion 78 accommodates at least a part of the one-way clutch 31 within a space located in the rear of the turbine hub 44. The first cylindrical portion 81 is fastened to the input shaft 30 on the inner side of the fixed sleeve 72 by means of a spline fitting. The first cylindrical portion 81 includes a circular lip 91 and an oil hole 92. The lip 91 is formed so that it projects forward from the base portion 83. The oil hole 92 is formed so that it passes diagonally through the base of the lip 91 between the inner perimeter face and the outer perimeter face of the lip 91.

The outer portion 79 includes a first cylindrical portion 84, positioned to the inside in the radial direction, a second cylindrical portion 85, positioned to the outside in the radial direction, and a base portion 86, positioned between the first and second cylindrical portions 84, 85 and orthogonal to the axial direction. The outer portion 79 accommodates the lock-up device 51 within a space located in the front of the turbine hub 44. The first cylindrical portion 84 extends parallel to the cylindrical portion 76. The second cylindrical portion 85 extends parallel to the stator hub 28. The base portion 86 extends parallel to the flat portion 73. The second cylindrical portion 85 functions as a clutch drum and is provided with oil holes 93 in a plurality of locations around its circumference, the oil holes 93 passing through the portion of the second cylindrical portion 85 that is central in the axial direction. Oil inside a clutch 55 is therefore discharged through the oil holes 93, providing a sufficient quantity of oil as lubrication to friction material that makes up inner side thin plates 101 and outer side thin plates 102.

The turbine runner 25 is supported by the turbine hub 44 and is joined to the turbine hub 44 by a weld at a joint 48.

In the torque converter 11, for example, the rotation that is transmitted from the engine to the front cover 13 via the crankshaft is transmitted to the pump impeller 24. As the pump impeller 24 rotates, the oil within the torque converter 11 is circulated by centrifugal force among the pump impeller 24, the turbine runner 25, and the stator 26, causing the turbine runner 25 to rotate. The rotation of the turbine runner 25 is transmitted to the turbine hub 44 and then to the input shaft 30.

In this manner, when the vehicle accelerates from a standstill immediately after the pump impeller 24 starts to rotate, or in other words, when the torque converter is stalled, the rotation transmitted from the engine is transmitted to the front cover 13, and then to the turbine hub 44 via the rear cover 14, pump impeller 24, and the turbine runner 25.

When the torque converter is stalled, the difference between the rotation speeds of the pump impeller 24 and the turbine runner 25 increases or becomes larger, and the oil flow due to the turbine runner 25 is in a direction that interferes with the rotation of the pump impeller 24. The stator 26 is positioned between the pump impeller 24 and the turbine runner 25. When the difference between the rotation speeds of the pump impeller 24 and the turbine runner 25 increases or becomes larger, the one-way clutch 31 locks, fixing the stator 26 in relation to the fixed sleeve 72, thereby switching the oil flow to a direction that assists the rotation of the pump impeller 24. At this time, torque is imparted or transmitted to the blades 29 from the oil flow, increasing the torque to that extent. In other words, the torque is amplified by the blades 29. As the difference in the rotation speeds of the pump impeller 24 and the turbine runner 25 decreases or becomes smaller, the torque amplification also becomes less or decreases.

As the rotation speed of the turbine runner 25 increases, the oil that is flowing against the front sides of the blades 29 starts to flow against the back sides. If the stator 26 is fixed in relation to the fixed sleeve 72, this may cause the stator itself to consume energy.

When the oil flows against the back sides of the blades 29, or in other words, when the coupling point is reached, the one-way clutch 31 is released so that the stator 26 can rotate freely. The rear edge of the outer race 32 is supported by a thrust bearing b1 such that the race rotates freely in relation to the pump hub 15. The front edge of the outer race 32 (to the right in FIG. 1) is supported by washers 95, 96, both of which are thrust bearings, such that the race rotates freely in relation to the turbine hub 44. Radial grooves 95a are formed at a plurality of locations around the circumference of the washer 95, on the face that is in contact with the one-way clutch 31. Oil holes 95b are formed to provide passages from the radial grooves 95a toward the front.

A cylindrical sliding member 97 is mounted by being pressed in at a prescribed part of the inner perimeter face of the lip 91. The sliding member 97 includes a cylindrical portion 97a, plus a flange portion 97b, which is formed so that it projects outward in the radial direction from the front edge of the cylindrical portion 97a. The inner perimeter face of the cylindrical portion 97a and the outer perimeter face of the front edge of the input shaft 30 slide in relation to one another. The front edge of the flange portion 97b makes contact with the front cover 13 via a ring-shaped washer 98, which is a thrust bearing. Therefore, the turbine hub 44 is supported in the radial direction relative to the input shaft 30 and in the axial direction relative to the front cover 13.

Grooves 98a, which have L-shaped cross sections, are formed in a plurality of locations around the circumference of the washer 98. The grooves 98a may be formed in the front face (to the right or front in FIG. 1) and/or the rear face (to the left or rear in FIG. 1) of the washer 98.

This allows the torque converter 11 to act as a torque converter when the rotation speed of the turbine runner 25 is low, or small, and to function in the same manner as a fluid coupling when the rotation speed of the turbine runner 25 increases to the point that it is nearly equal to the rotation speed of the pump impeller 24.

When the torque converter 11 acts as a fluid coupling, the torque converter 11 does not increase the torque, but instead, only transmits rotation. That is, as a fluid coupling, the torque converter 11 is unable to increase the torque. Accordingly, the torque converter 11 only transmits rotation. For this reason, the torque decreases to the extent that energy is lost due to churning of the oil and other causes, which in turn decreases the torque transmission efficiency.

For that reason, the lock-up device 51 is installed adjacent to the turbine hub 44 in the axial direction, and in the radial direction, to the inside of the stator 26 and to the outside of the one-way clutch 31. When the vehicle speed reaches a set value and the rotation speed of the turbine runner 25 reaches a prescribed value, the lock-up device 51 is engaged, so that the rotation transmitted from the engine is transmitted directly to the turbine hub 44, thereby increasing the torque transmission efficiency. The damper device 50 is installed between the lock-up device 51 and the front cover 13 to absorb the torque fluctuation that is generated in conjunction with the engaging and disengaging of the lock-up device 51.

The lock-up device 51 includes a lock-up piston 52, a clutch drum 53, a clutch hub 54, the clutch 55, and the like. The lock-up piston 52 is shaped to match the shape of the turbine hub 44 and is installed such that the lock-up piston 52 can advance and retract freely in the axial direction moves to the right (front) and left (rear) as shown in FIG. 1). The clutch drum 53 forms a portion of the turbine hub 44. The clutch hub 54 is mounted on the damper device 50, inward from the clutch drum 53 in the radial direction, extending rearward from the damper device 50 and parallel to the clutch drum 53. The clutch 55 is positioned between the clutch drum 53 and the clutch hub 54 such that the clutch 55 engages and disengages freely. The clutch 55 serves as both a multi-plate friction engagement element and an engaging and disengaging member. Oil through-holes 54a are formed at a plurality of locations around the circumference of the clutch hub 54 such that a sufficient quantity of oil is provided as lubrication to the clutch 55 via the oil holes 54a.

The lock-up piston 52 includes a sliding portion 56, a flange portion 57, a cylindrical portion 58, and a pressing portion 59. The sliding portion 56 is formed so that it extends in the axial direction along the outer perimeter face of the lip 91. The flange portion 57 is formed so that it extends outward in the radial direction from the rear edge of the sliding portion 56 along the base portion 83. The cylindrical portion 58 is formed so that it extends rearward in the axial direction from the outer perimeter edge of the flange portion 57 and along the second cylindrical portion 82 and the first cylindrical portion 84. The pressing portion 59 is formed so that it extends outward in the radial direction from the rear edge of the cylindrical portion 58 and along the base portion 86. Oil through-holes h1 are formed at a plurality of locations around the circumference of the pressing portion 59.

The clutch 55 includes the three inner side thin plates 101, the three outer side thin plates 102, a retainer 103, a snap ring 104, and the like. The inner side thin plates 101 are mounted by means of spline fittings as first engaging members that move freely in the axial direction in relation to the clutch hub 54. The outer side thin plates 102 are mounted by means of spline fittings as second engaging members that move freely in the axial direction in relation to the clutch drum 53. The retainer 103 holds the inner side thin plates 101 and the outer side thin plates 102 so that they do not slip when they engage the clutch 55. The snap ring 104 is secured to the inner perimeter face of the clutch drum 53 and serves as a restricting member that restricts the movement of the retainer 103. The inner side thin plates 101 and the outer side thin plates 102 are formed from friction material.

The lock-up piston 52 is sealed by seal rings between the piston and the outer perimeter face of the lip 91 and between the piston and the outer perimeter face of the second cylindrical portion 82. An engaging side oil chamber 77 is formed as a first oil chamber between the flange portion 57 and the base portion 83. The engaging side oil chamber 77 communicates with the second oil passage L-2 via the oil hole 92. A releasing side oil chamber 80 is formed as a second oil chamber on the outer side of the lock-up piston 52. The releasing side oil chamber 80 communicates with the third oil passage L-3 via the grooves 98a. When oil is supplied via the second oil passage L-2 and the oil pressure in the engaging side oil chamber 77 becomes greater than the oil pressure in the releasing side oil chamber 80, the lock-up piston 52 advances (moves to the right or towards the front as shown in FIG. 1), so that the pressing portion 59 causes the inner side thin plates 101 and the outer side thin plates 102 to press against the retainer 103, thereby engaging the clutch 55. As a result, the rotation that is transmitted from the engine is transmitted to the turbine hub 44 via the damper device 50 and the lock-up device 50. At this time, a first power transmission route is formed by the front cover 13, the damper device 50, the lock-up device 51, the turbine hub 44, and the input shaft 30.

When oil is supplied via the third oil passage L-3 and the grooves 98a, so that the oil pressure in the releasing side oil chamber 80 becomes greater than the oil pressure in the engaging side oil chamber 77, the lock-up piston 52 retracts (moves to the left or towards the rear as shown in FIG. 1). The pressing portion 59 no longer presses the inner side thin plates 101 and the outer side thin plates 102 against the retainer 103, so the inner side thin plates 101 and the outer side thin plates 102 are allowed to rotate relative to each other, and the clutch 55 is released. The rotation that is transmitted from the engine is transmitted to the turbine hub 44 via the pump impeller 24 and the turbine runner 25. At this time, a second power transmission route is formed by the front cover 13, the pump impeller 24, the turbine runner 25, the turbine hub 44, and the input shaft 30. Note that as the lock-up piston 52 advances and retracts, oil moves in and out between the lock-up piston 52 and the outer portion 79 via the oil holes h1, so that there is no load imposed against the advancing and retracting of the lock-up piston 52.

The damper device 50 includes first and second helical compression spring dampers 111, 112 as a grouping of energizing members, as well as driven plates 115 and drive plates 116. The driven plates 115 enclose the first and second helical compression spring dampers 111, 112 and hold them so that they can slide freely in the circumferential direction. The drive plates 116 are sandwiched between the driven plates 115 and are installed so that they can slide freely in the circumferential direction in relation to the driven plates 115. The drive plates 116 include an outer plate 116a and an inner plate 116b that sandwich the first helical compression spring damper 111 in the circumferential direction and are installed so that they move freely in relation to one another. A bracket 131, which has an L-shaped cross section, is attached by welding close to the outer perimeter edge of the front cover 13. The outer plate 116a is engaged in such a way that it cannot move in the circumferential direction in relation to the bracket 131. Note that a snap ring 132 is attached to the bracket 131 to hold it in place in order to prevent the damper device 50 from moving in the axial direction.

The first helical compression spring damper 111 is made up of a double coil. The second helical compression spring damper 112 is made up of a single coil and is positioned to the outside of the first helical compression spring damper 111 in the radial direction. The driven plates 115 enclose and hold the first and second helical compression spring dampers 111, 112. In order to sandwich the drive plates 116 in such a way that they can slide freely, the driven plates 115 are made up of first and second plates 121, 122, which are positioned respectively on the front side (the right side in FIG. 1) and rear side (the left side in FIG. 1) of the drive plates 116. The first and second plates 121, 122 are connected at a plurality of locations in the circumferential direction by rivets 123 that serve as fastening members.

The clutch 55 engages and disengages in conjunction with the advancing and retracting of the lock-up piston 52. When the clutch 55 engages, the rotation that is transmitted by the front cover 13 is transmitted to the turbine hub 44 via the damper device 50.

The clutch hub 54 is fastened by welding to the inner perimeter edge of the damper device 50, which, for example, is the inner perimeter edge of the second plate 122. Therefore, the damper device 50 is positioned to the outside of the one-way clutch 31 in the radial direction and is adjacent to the pump impeller 24, the turbine runner 25, and the clutch 55 in the axial direction.

Thus, the one-way clutch 31, the lock-up device 51, and the toroid portion are positioned so that they overlap in the axial direction, making it possible to reduce the size of the torque converter 11 in the axial direction. The torque converter 11 can therefore be made more compact.

Because ample space for installing the damper device 50 can be ensured, a high-performance damper device with high torsion and a large capacity for absorbing vibration can be used as the damper device 50. Therefore, the torque fluctuation that is generated in conjunction with the engaging and disengaging of the lock-up device 51 can be adequately absorbed. Moreover, because the clutch 55 can engage more quickly to that extent, fuel economy can be improved.

A portion of the lock-up piston 52, which, for example, is the flange portion 57, can be positioned to the inside of the damper device 50 in the radial direction. In other words, the damper device 50 and the lock-up piston 52 can be made to overlap in the axial direction. Therefore, the size of the torque converter 11 in the axial direction can be further reduced, and the torque converter 11 can therefore be made more compact.

Because the lock-up device 51 can be positioned to the inside of the toroid portion in the radial direction, an ample amount of oil can be supplied as a lubricant to the friction material that makes up the inner side thin plates 101 and the outer side thin plates 102. Therefore, the durability of the clutch 55 can be improved.

Because the damper device 50 is positioned toward the engine side from the clutch 55, the inertia on the engine side becomes greater, and the inertia on the transmission side decreases. Therefore, the generation of shift shock due to the slipping of the clutch 55 during shifting can be more adequately suppressed to the extent that the inertia on the transmission side is decreased.

Because oil is supplied to and drained from the oil chamber via the second oil passage L-2, oil can be supplied to and drained from the oil chamber without passing through the space between the lock-up piston 52 and the front cover 13.

In the torque converter 11, the oil is supplied from the inside in the radial direction via the first to third oil passages L-1 to L-3 and is sent to the lock-up device 51. But if, for example, the toroid portion were positioned to the inside of the lock-up device 51 in the radial direction, the toroid portion would become a heat source. The temperature of the oil sent to the lock-up device 51 would then be higher, so it could not adequately cool the clutch 55. By contrast, in the exemplary embodiment, the toroid portion is positioned to the outside of the lock-up device 51 in the radial direction, so higher-temperature oil is not sent to the lock-up device 51, and the clutch 55 can be adequately cooled. Therefore, the durability of the clutch 55 can be improved.

Next, a second embodiment of the invention will be explained using a fluid coupling instead of the torque converter 11. Note that for elements having the same structure as in the first embodiment, the same reference symbols are used and explanations thereof are substantially omitted. To the extent that the second embodiment has the same structure as the first embodiment, the effects resulting therefrom are the same.

Figure 2:
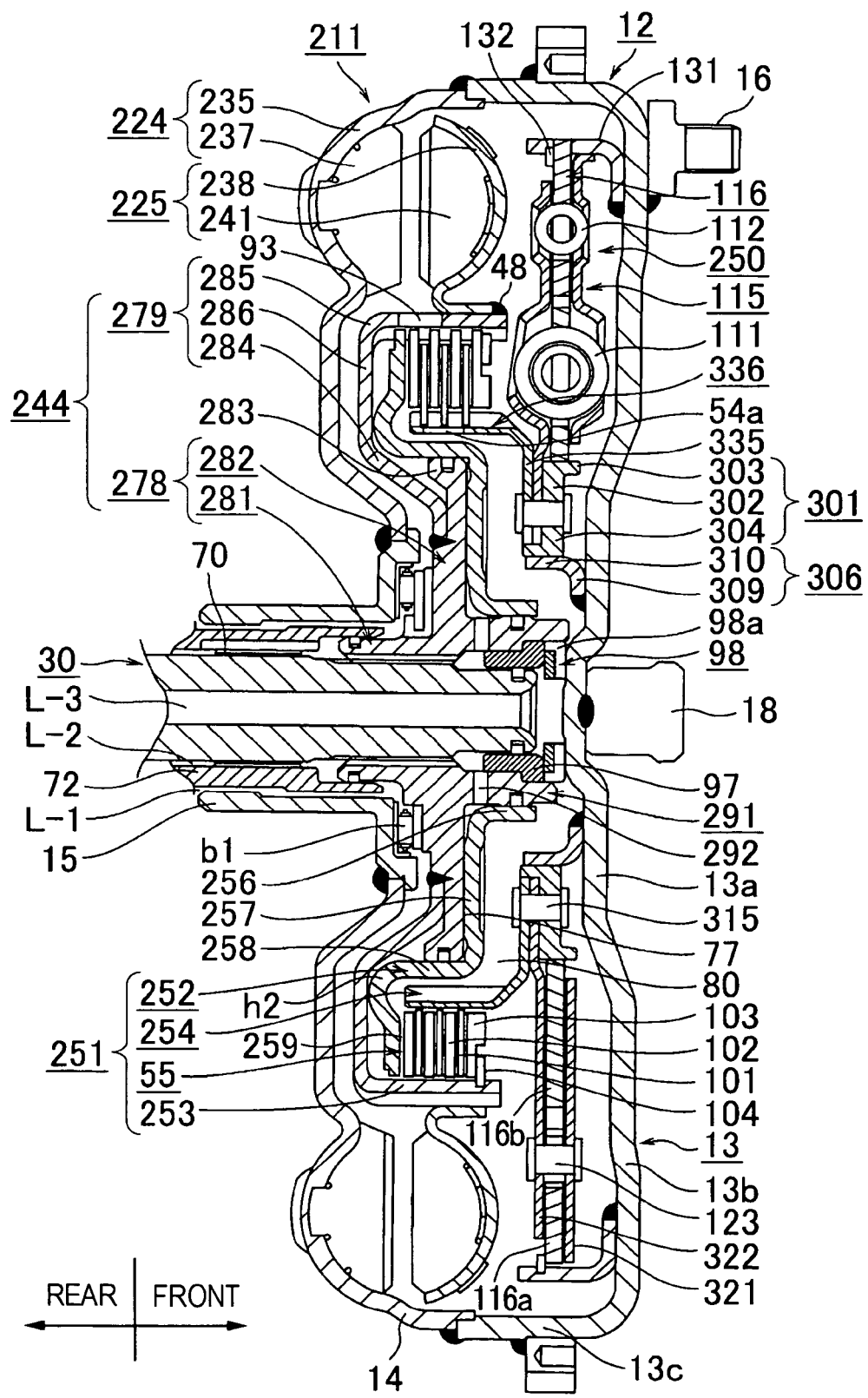
FIG. 2 is a sectional view of a fluid coupling in accordance with a second embodiment of the invention.

FIG. 2 is a sectional view of a fluid coupling in accordance with the second embodiment of the invention.

In FIG. 2, the reference numeral 211 denotes the fluid coupling. The fluid coupling 211 includes a pump impeller 224, a turbine runner 225, a turbine hub 244, a lock-up device 251, and a damper device 250. The pump impeller 224 is connected to a case 12 and a front cover 13 and is installed in such a manner that it rotates freely. When rotation is imparted or transmitted to the pump impeller 224 by the front cover 13, the pump impeller 224 causes oil, as a working fluid, to flow by centrifugal force from the inner perimeter to the outer perimeter. The turbine runner 225 faces the pump impeller 224 and is installed in such a manner that it rotates freely. When the flow of oil to the outer perimeter that accompanies the rotation of the pump impeller 224 reaches the turbine runner 225, the return flow of the oil toward the inner perimeter causes the turbine runner 225 to rotate. The turbine hub 244 supports the turbine runner 225 and is installed in such a manner that it rotates freely. The lock-up device 251 is installed in such a manner that it engages and disengages freely. The lock-up device 251 receives the rotation transmitted from the engine (not shown), which serves as a drive power source, and mechanically transmits the rotation, not via the oil, to the turbine hub 244. The damper device 250 is attached to the front cover 13 and absorbs the torque fluctuation that is generated by the engagement and disengagement of the lock-up device 251. Note that the pump impeller 224 and the turbine runner 225 form a toroid portion.

The pump impeller 224 includes an outer shell 235 and a plurality of blades 237. The outer shell 235 is formed by a part of a rear cover 14. The blades 237 are attached to the outer shell 235. The turbine runner 225 includes an outer shell 238 and a plurality of blades 241. The blades 241 are attached to the outer shell 238.

The inner perimeter edge of the turbine hub 244 is fastened to a transmission input shaft 30 by means of a spline fitting. The outer perimeter edge of the turbine hub 244 is fastened to the turbine runner 225. The rotation of the turbine runner 225 is transmitted to the input shaft 30.

The turbine hub 244 is a ring-shaped body with an S-shaped cross section and includes an inner portion 278 as a first portion that functions as an oil servo and an outer portion 279 as a second portion that functions as a clutch drum. The outer portion 279 is positioned mainly to the rear of the lock-up device 251 (on the left in FIG. 2) and is enveloped by the lock-up device 251. The inner portion 278 and the outer portion 279 are joined by a weld.

The inner portion 278 includes a cylindrical portion 281, a flange portion 282, and a sliding portion 283. The cylindrical portion 281 is positioned to the inside in the radial direction, and the flange portion 282 is formed so that it projects outward in the radial direction from the front edge (the right edge in FIG. 2) of the cylindrical portion 281. The sliding portion 283 is formed on the outer perimeter edge of the flange portion 282. The cylindrical portion 281 is fastened to the input shaft 30 on the inner side a fixed sleeve 72 by means of a spline fitting. The cylindrical portion 281 includes a circular lip 291 and an oil hole 292. The lip 291 is formed so that it projects forward (to the right in FIG. 2) from the flange portion 282. The oil hole 292 is formed so that it passes in the radial direction through the base of the lip 291 between the inner perimeter face and the outer perimeter face of the lip 291.

The outer portion 279 includes a slanting portion 284, a cylindrical portion 285, and a base portion 286. The slanting portion 284 is formed so that it extends obliquely outward from the portion of the flange portion 282 that is central in the radial direction. The cylindrical portion 285 is positioned to the outside of the slanting portion 284 in the radial direction and functions as a clutch drum. The base portion 286 is positioned between the slanting portion 284 and the cylindrical portion 285 and is orthogonal to the axial direction. The outer portion 279 accommodates the lock-up device 251 within a space that is open to the front.

The turbine runner 225 is supported by the turbine hub 244 and is joined to the turbine hub 244 by a weld at a joint 48. The rotation of the turbine runner 225 is transmitted to the turbine hub 244. The rotation of the turbine hub 244 is transmitted to the input shaft 30.

In the fluid coupling 211, for example, the rotation that is transmitted from the engine to the front cover 13 via the crankshaft is transmitted to the pump impeller 224. As the pump impeller 224 rotates, the oil within the fluid coupling 211 is circulated by centrifugal force between the pump impeller 224 and the turbine runner 225, causing the turbine runner 225 to rotate.

Because the fluid coupling 211 only transmits rotation, the torque decreases to the extent that energy is lost due to churning of the oil and other causes, which in turn decreases the torque transmission efficiency.

For that reason, the lock-up device 251 is installed adjacent to the turbine hub 244 in the axial direction, and in the radial direction, to the inside of the turbine runner 225 and to the outside of the inner portion 278. When the vehicle speed reaches a set value and the rotation speed of the turbine runner 225 reaches a prescribed value, the lock-up device 251 is engaged, so that the rotation transmitted from the engine is transmitted directly to the turbine hub 244, thereby increasing the torque transmission efficiency. The damper device 250 is installed between the lock-up device 251 and the front cover 13 to absorb the torque fluctuation that is generated in conjunction with the engaging and disengaging of the lock-up device 251.

The lock-up device 251 includes a lock-up piston 252, a clutch drum 253, a clutch hub 254, a clutch 55, and the like. The lock-up piston 252 is shaped to match the shape of the turbine hub 244 and is installed such that it can advance and retract freely in the axial direction (moves to the right (front) and left (rear) as shown in FIG. 2). The clutch drum 253 forms a portion of the turbine hub 244. The clutch hub 254 is mounted on the damper device 250, inward from the clutch drum 253 in the radial direction, extending rearward from the damper device 250 and parallel to the clutch drum 253. The clutch 55 is positioned between the clutch drum 253 and the clutch hub 254 such that it engages and disengages freely. The clutch 55 serves as both a multi-plate friction engagement element and an engaging and disengaging member. The clutch hub 254 has an L-shaped cross section and includes a mount portion 335 and a hub portion 336. The mount portion 335 is formed so that it extends in the radial direction. The hub portion 336 is formed so that it projects rearward from the outer perimeter edge of the mount portion 335. Oil holes 54$a$ are formed in the hub portion 336.

The lock-up piston 252 includes a sliding portion 256, a flange portion 257, a cylindrical portion 258, and a pressing portion 259. The sliding portion 256 is formed so that it extends in the axial direction along the outer perimeter face of the lip 291. The flange portion 257 is formed so that it extends outward in the radial direction from the rear edge of the sliding portion 256 along the flange portion 282. The cylindrical portion 258 is formed so that it extends rearward in the axial direction from the outer perimeter edge of the flange portion 257, in contact with the sliding portion 283, and along the clutch hub 254. The pressing portion 259 is formed so that it extends outward in the radial direction from the rear edge of the cylindrical portion 258 and along the base portion 286. Oil through-holes h2 are formed at a plurality of locations around the circumference between the cylindrical portion 258 and the pressing portion 259.

The lock-up piston 252 is sealed by seal rings between the piston and the outer perimeter face of the lip 291 and between the piston and the outer perimeter face of the sliding portion 283. An engaging side oil chamber 77 is formed as a first oil chamber between the flange portions 257 and 282. The engaging side oil chamber 77 communicates with a second oil passage L-2 via the oil hole 292. A releasing side oil chamber 80 is formed as a second oil chamber on the outer side of the lock-up piston 252. The releasing side oil chamber 80 communicates with a third oil passage L-3 via grooves 98a.

The damper device 250 includes first and second helical compression spring dampers 111, 112 as a grouping of energizing members, as well as driven plates 115 and drive plates 116. The driven plates 115 enclose the first and second helical compression spring dampers 111, 112 and hold them so that they can slide freely in the circumferential direction. The drive plates 116 are sandwiched between the driven plates 115 and are installed so that they can slide freely in the circumferential direction in relation to the driven plates 115. The drive plates 116 include an outer plate 116a and an inner plate 116b that sandwich the first helical compression spring damper 111 in the circumferential direction and are installed so that they move freely in relation to one another. A bracket 131, which has an L-shaped cross section, is attached by welding close to the outer perimeter edge of the front cover 13. The outer plate 116a is engaged in such a way that it cannot move in the circumferential direction in relation to the bracket 131.

The driven plates 115 are made up of first and second plates 321, 322, which enclose and hold the first and second helical compression spring dampers 111, 112 and are positioned respectively on the front side (the right side or front in FIG. 2) and rear side (the left side or rear in FIG. 2) of the drive plates 116 in order to sandwich the drive plates 116 in such a way that they can slide freely. The first and second plates 321, 322 are connected at a plurality of locations in the circumferential direction by rivets 123.

In order to connect the clutch hub 254 and the damper device 250, the second plate 322 is formed so that it projects farther inward in the radial direction than does the first plate 321. Close to the inner perimeter edge of the second plate 322, the mount portion 335 is connected to a ring-shaped sliding member 301 by rivets 315 that serve as fastening members.

The clutch hub 254 is fastened by the rivets 315 to the inner perimeter edge of the damper device 250, which, for example, is the inner perimeter edge of the second plate 322. Therefore, the main part of the damper device 250 is positioned to the outside of the engaging side oil chamber 77 in the radial direction. In the axial direction, the damper device 250 is adjacent to the pump impeller 224, the turbine runner 225, and the clutch 55.

The sliding member 301 includes a flat portion 302, which extends in the radial direction, as well as a first sliding portion 303 and a second sliding portion 304. The first sliding portion 303 is formed so that it projects the outer perimeter edge of the flat portion 302 toward the front. The second sliding portion 304 is formed so that it projects the inner perimeter edge of the flat portion 302 toward the rear. The outer perimeter face of the first sliding portion 303 and the inner perimeter face of the inner plate 116b are in contact, so that the inner plate 116b is supported by the sliding member 301 in such a way that it can slide freely.

A ring-shaped bracket 306 is attached by welding to a point close to the center of the front cover 13, which, for example, is to the outside of the lip 291 in the radial direction. The bracket 306 has an L-shaped cross section and includes a mount portion 309 and a support portion 310. The mount portion 309 is formed so that it extends in the radial direction. The support portion 310 is formed so that it extends rearward from the outer perimeter edge of the mount portion 309. The outer perimeter face of the support portion 310 and the inner perimeter face of the second sliding portion 304 are in contact, so that the damper device 250 is supported by the bracket 306 in such a way that it can move freely in the direction of rotation and is centered around a center piece 18.

A prescribed gap is formed between the bracket 306 and the lip 291, and the support portion 310 is formed to be parallel to the sliding portion 256. Therefore, the oil that enters the releasing side oil chamber 80 from the grooves 98a through the gap between the lip 291 and the front cover 13 is guided by the bracket 306 so that it is supplied efficiently as a lubricant to the clutch 55.

When the clutch 55 engages and disengages in conjunction with the advancing and retracting of the lock-up piston 252, the rotation that is transmitted by the front cover 13 is transmitted to the turbine hub 244 via the damper device 250.

In the second embodiment, the lock-up device 251 and the toroid portion are positioned so that they overlap in the axial direction, making it possible to reduce the size of the fluid coupling 211 in the axial direction. The fluid coupling 211 can therefore be made more compact.

Because ample space for installing the damper device 250 can be ensured, a high-performance damper device with high torsion and a large capacity for absorbing vibration can be used as the damper device 250. Therefore, the torque fluctuation that is generated in conjunction with the engaging and disengaging of the lock-up device 251 can be adequately absorbed. Moreover, because the lock-up device 251 can engage more quickly to that extent, fuel economy can be improved.

A portion of the lock-up piston 252, which, for example, is the flange portion 257, can be positioned to the inside of the damper device 250 in the radial direction. In other words, the damper device 250 and the lock-up piston 252 can be made to overlap in the axial direction. Therefore, the size of the fluid coupling 211 in the axial direction can be further reduced, and the fluid coupling 211 can therefore be made more compact.

Because the lock-up device 251 can be positioned to the inside of the toroid portion in the radial direction, an ample amount of oil can be supplied as a lubricant to the friction material that makes up inner side thin plates 101 as first engaging members and outer side thin plates 102 as second engaging members. Therefore, the durability of the lock-up device 251 can be improved.

Because the damper device 250 is positioned toward the engine side from the lock-up device 251, the inertia on the engine side becomes greater, and the inertia on the transmission side decreases to that extent. Therefore, the generation of shift shock due to the slipping of the lock-up device 251 during shifting can be more adequately suppressed or reduced to the extent that the inertia on the transmission side is decreased.

Because oil is supplied to and drained from the oil chamber via the second oil passage L-2, oil can be supplied to and drained from the oil chamber without passing through the space between the lock-up piston 252 and the front cover 13.

The scope of the invention is not limited by the embodiments disclosed herein. Various modifications are possible based on the essence of the invention and are included within the spirit and scope of the claims.

What is claimed is:

1. A hydraulic power transmission device, comprising:
   a front cover engaged with a drive power source;
   a rear cover engaged with the front cover;

a pump impeller attached to the rear cover;

a toroid portion that includes a turbine runner that is installed such that fluid transmits a drive power from the pump impeller;

a turbine hub engaged with an input shaft of a transmission and holds the turbine runner; and a lock-up device that is connected to the turbine hub, wherein:

when the lock-up device is released, a power transmission route is formed by the front cover, the pump impeller, the turbine runner, the turbine hub, and the input shaft, when the lock-up device is engaged, a power transmission route is formed by the front cover, the lock-up device, the turbine hub, and the input shaft, the lock-up device includes a clutch drum, the clutch drum is engaged with the turbine hub, and overlaps with the toroid portion in an axial direction, and an engaging side oil chamber is formed to the inside of an engaging and disengaging member of the lock-up device in a radial direction.

2. The hydraulic power transmission device according to claim 1, wherein the lock-up device is positioned to the inside of the toroid portion in a radial direction.

3. The hydraulic power transmission device according to claim 1, wherein the engaging side oil chamber communicates with an oil passage that is formed on an outer side of the input shaft.

4. The hydraulic power transmission device according to claim 1, wherein the toroid is positioned outside of the lock-up device.

5. The hydraulic power transmission device according to claim 1, wherein the lock-up device includes:

a lock-up piston;

the clutch drum;

a clutch hub;

and a clutch, the lock-up piston is shaped to match a shape of the turbine hub and is installed such that the lock-up piston advances and retracts freely in the axial direction.

6. The hydraulic power transmission device according to claim 5, wherein the clutch hub is mounted on a damper device, inward from the clutch drum in a radial direction, extending rearward from the damper device and parallel to the clutch drum.

7. The hydraulic power transmission device according to claim 5, wherein the clutch is positioned between the clutch drum and the clutch hub such that the clutch engages and disengages freely and serves as both a multi-plate friction engagement element and the engaging and disengaging member.

8. The power transmission device according to claim 6, wherein the damper device is positioned toward an engine side from the clutch of the lock-up device.

9. A hydraulic power transmission device, comprising:

a toroid portion having a pump impeller and a turbine runner;

a turbine hub;

a front cover; and a lock-up device, wherein:

the turbine runner is supported by the turbine hub and joined to the turbine hub by a joint, the turbine hub engages an input shaft of a transmission, the lock-up device is installed to freely engage and disengage and to mechanically transmit a rotational force that is transmitted from an engine to the turbine hub, when the lock-up device is released, a power transmission route is formed by the front cover, the pump impeller, the turbine runner, the turbine hub, and the input shaft, when the lock-up device is engaged, a power transmission route is formed by the front cover, the lock-up device, the turbine hub, and the input shaft, and an engaging side oil chamber is formed to the inside of an engaging and disengaging member of the lock-up device in a radial direction.

10. The hydraulic power transmission device according to claim 9, wherein the hydraulic power transmission device defines a fluid coupling that does not increase torque.

11. The hydraulic power transmission device according to claim 9, a damper device being installed between the lock-up device and the front cover of the hydraulic power transmission device to absorb the torque fluctuation generated in conjunction with an engaging and disengaging of the lock-up device.

12. The hydraulic power transmission device according to claim 11, wherein oil is supplied to and drained from an oil chamber via an oil passage without passing through a space between the lock-up device and the front cover.

13. The hydraulic power transmission device according to claim 9, a lock-up piston being shaped to match a shape of the turbine hub and being installed such that the lock-up device advances and retracts freely in an axial direction.

14. The hydraulic power transmission device according to claim 9, the lock-up device and the toroid portion are positioned to overlap in an axial direction.

\* \* \* \* \*